United States Patent [19]
Campbell et al.

[11] Patent Number: 5,983,259
[45] Date of Patent: Nov. 9, 1999

[54] SYSTEMS AND METHODS FOR TRANSMITTING AND RECEIVING DATA IN CONNECTION WITH A COMMUNICATIONS STACK IN A COMMUNICATIONS SYSTEM

[75] Inventors: Scott Allan Campbell, Cary; Dale C. Gugliotta, Raleigh; Lynn Douglas Long, Chapel Hill; Louis F. Menditto, Raleigh, all of N.C.; Masashi E. Miyake, Poughkeepsie, N.Y.; Linwood Hugh Overby, Raleigh, N.C.; Bala Rajaraman, Raleigh, N.C.; Arthur James Stagg, Raleigh, N.C.

[73] Assignee: International Business Machines Corp., Armonk, N.Y.

[21] Appl. No.: 08/802,598

[22] Filed: Feb. 19, 1997

[51] Int. Cl.⁶ .................................................. G06F 13/00
[52] U.S. Cl. ........................................................... 709/200
[58] Field of Search ...................... 364/DIG. 1 MS File, 364/DIG. 2 MS File; 395/200.3, 200.53, 200.57, 200.58, 200.6, 200.61, 200.62, 200.66, 200.67, 200.68; 709/200, 223, 227, 228, 230, 231, 232, 237, 238, 239

[56] References Cited

U.S. PATENT DOCUMENTS

| | | | |
|---|---|---|---|
| 4,365,295 | 12/1982 | Katzman et al. | 711/206 |
| 4,586,134 | 4/1986 | Norstedt | 709/228 |
| 4,926,322 | 5/1990 | Stimac et al. | 395/500 |
| 5,027,269 | 6/1991 | Grant et al. | 709/300 |
| 5,269,013 | 12/1993 | Abramson et al. | 711/170 |
| 5,278,834 | 1/1994 | Mazzola | 370/469 |
| 5,297,265 | 3/1994 | Frank et al. | 711/202 |
| 5,386,536 | 1/1995 | Courts et al. | 711/136 |
| 5,396,614 | 3/1995 | Khalidi et al. | 711/118 |

OTHER PUBLICATIONS

"Trailer Encapsulations", Network Working Group, Request for Comments: 893, Samuel J. Leffler and Michael J. Karels, University of California at Berkeley, Apr. 1984.
VTAM V4R1 Announcement Nos. 292–168, 292–483, and 293–276, IBM Corp.

*Primary Examiner*—Robert B. Harrell
*Attorney, Agent, or Firm*—Jerry W. Herndon

[57] ABSTRACT

Management of datastream construction prior to transmission of the datastream across a channel of a communications system by providing for data blocking while reducing movement or copying of the data improves the performance in a communications system. Multiple header segments received from a higher layer in the communications stack are copied into the datastream header area of a datastream such that the header segments are sequentially stored in the datastream header area. A datastream buffer list having entries referencing the datastream header area is generated. Buffer list entries referencing data segments received from higher layers in the communications stack are also stored in the datastream buffer list. The data segments are not physically moved or copied into the datastream during processing by the communications stack. Rather, a "virtual" datastream is generated by the communications stack for transmission without physically moving or copying the data segment. The datastream is transmitted across the channel by the system input/output interface by first writing the datastream header area referenced by the datastream buffer list directly into the channel, and the data segments directly from their original storage location into the channel of the communications system using the datastream buffer list entries.

33 Claims, 12 Drawing Sheets

SYSTEMS AND METHODS FOR TRANSMITTING AND RECEIVING DATA IN CONNECTION WITH A COMMUNICATIONS STACK IN A COMMUNICATIONS SYSTEM

FIELD OF THE INVENTION

This invention relates to data communications, and more particularly, to transmission and receipt of data in a communications system.

BACKGROUND OF THE INVENTION

A communications system or network may be generally defined as a collection of computers or computing systems which interact and transmit data from one computer (i.e., node) on the network to another. The functional capabilities of the nodes may range from terminals with minimal local processing capability to complex multiprocessors capable of high speed local processing. A node incorporates a set of control functions required to ensure that network interfaces comply with networking standards or architectures. These control functions may be grouped into sets based on function. For example, in the Systems Network Architecture ("SNA") developed by International Business Machines Corporation ("IBM"), the assignee of the present invention, SNA defines a Physical Unit ("PU"), which controls operation of real network resources such as links, and a Logical Unit ("LU") which controls logical software based entities such as applications. Other networking architectures define similar functional groupings.

The communications facilities which interconnect the nodes also may vary, ranging from high speed input/output ("I/O") channels to low speed, point-to-point telephone lines. By way of example, the media used to implement the communications facilities may include satellite links or wide band optical fibers.

Referring to FIG. 1, a high level block diagram illustrating the components of an application-to-application communications network with two nodes, in this case, host computers, in a direct-attach environment is illustrated at 10. This type of view of the application-to-application communications network is sometimes referred to as an "end-to-end" view. The two host computers are illustrated at 12 and 14, respectively. The host computers, for example, may be IBM 390 Mainframe computers manufactured by International Business Machines Corporation ("IBM"), the assignee of the present invention. Each host computer has an "outbound" side 16 for sending data across the network and an "inbound" side 18 for receiving data transmitted across the network. In addition, applications execute on the host computers as illustrated at 20 and 22. Once an application has processed data and requests that data is to be sent to another node on the network, the data to be transmitted is then processed in the communications stacks 24 and 26 at the node on which the application is executing and transmitted via the system input/output ("I/O") interface 28. System I/O interface 28 also serves to assist in the receiving of data transmitted across the network.

By way of example, the present invention may also function in the communications network environment similar to that illustrated at 10' in FIG. 2. In the communications network illustrated in FIG. 2, two host computers are illustrated at 50 and 52. Host computer 50 as illustrated has the capability for managing relatively large data objects in a communications stack in accordance with the present invention. Computer 54 is a controller which simply is used as a router in the network for routing data which has been processed for transmission by host computer 50 across network 60. Applications execute on host computer 50 as illustrated at 62. Once an application has processed data and requests the data to be sent to another node on the network, the data to be transmitted is then processed in the communications stack 64.

Communications across a communications system such as that illustrated in FIGS. 1 or 2 may be controlled by a network architecture. One network architecture which may be implemented on a communications system such as that illustrated in FIGS. 1 or 2 is the Systems Network Architecture ("SNA") developed by IBM, the assignee of the present invention. SNA is a network architecture intended to allow users to construct their own private network on a communications system. An SNA network may be defined as a collection of machines or computers (i.e., nodes). There are several different types of nodes in an SNA network, including terminals, controllers that supervise the behavior of terminals and other peripherals, front-end processors which relieve the main central processing unit of the work and interrupt handling associated with data communications, and the main host computers. In essence, SNA specifies how nodes connect and communicate with one another. Moreover, SNA enables the system to share network resources by avoiding the necessity to install separate communication links for different types of workstations or dissimilar applications, and reducing the number of programs and devices.

The functions of the communications stack in an SNA network may be organized into several layers. Referring to FIG. 3, one manner of illustrating the hierarchial layers of SNA at a given node on a communications system implementing the SNA architecture (i.e., the communications stack) is shown generally at 100. Each node in the communications network operating under the SNA architecture generally has the same hierarchial software structure so as to enable communications between the nodes. In the illustration shown in FIG. 3, these layers of the communications stack include the physical control layer 102 which connects adjacent nodes physically and electrically for physically transporting bits from one machine to another, the data link control layer 104 which constructs frames from the raw bit stream for transmitting data between adjacent nodes and detecting and recovering from transmission errors in a way transparent to higher layers, the path control layer 106 (sometimes referred to as the network layer) which routes data between source and destination nodes and controls data traffic in the network, and the transmission control layer 108 (sometimes referred to as the transport layer) which creates, manages and deletes transport connections (i.e., sessions). The SNA layers also include the data flow control layer 110 (sometimes referred to as the session layer) which synchronizes data flow between end points of a session so as to establish and control a session between two end users for conversation purposes, the presentation services layer 112 which formats data for different presentation media and coordinates the sharing of resources, the transaction services layer 114 which provides application services such as distributed database access and document interchange, and finally, the network user or application layer 116 which relates to the conversation per se between two end users.

The physical control 102, data link control 104, path control 106 and transmission control 108 layers may be referred to as the "lower" layers 120 of the SNA model as it relates to the Open Systems Interface Reference Model ("OSI"). The data flow control 110, presentation services 112 and transaction services 114 layers may be referred to as the "upper" layers 122 of the architecture. Finally, the combination of the upper layers 122 and the lower layers 120 may be viewed as the communications stack 124.

The access methods which reside on the host processors provide a source of control for an SNA network. One such access method is the Virtual Telecommunications Access Method ("VTAM") which provides the interface between applications programs and a host processor and other resources in an SNA network. In essence, VTAM is a program that controls communication between terminals and application programs, and between applications, within the same or different SNA nodes. Communication between VTAM applications programs and the host and network terminals can generally occur only through VTAM. VTAM also monitors the performance of a network, identifies locations for potential problems, and assists in recovery from network failures. VTAM runs under the control of a virtual operating system such as the Multiple Virtual Storage ("MVS"), Virtual Machine/System Product ("VM/SP"), and Virtual Storage Extended ("VSE") operating systems. When operating in the MVS environment, VTAM enables independent SNA networks to communicate with each other.

VTAM application programs run under control of the operating system similar to any other programs. However, a VTAM applications program is generally connected to VTAM before it communicates with terminals or other applications in the network. A VTAM applications program uses VTAM macro instructions to communicate with terminals. An applications program within a host processor can be used at any location in the network without the program having any awareness of the organization of the network. VTAM provides the following major functions: starting and stopping the network; dynamically changing the configuration of the network; allocation of network resources; and control of input/output processing.

Referring to FIG. 4, the major components of a communications system 200 operating under VTAM including the host computer 202 containing VTAM 206 and VTAM applications programs 204 are illustrated. The host computer 202 is connected to secondary storage (i.e., auxiliary storage) 208 as well as the telecommunications network 210. The telecommunications network 210 may be divided into the SNA Terminal Environment 212 and Local 3270, BSC and Start/Stop Terminal Environment 214. In particular, the host computer is connected to the local computers and terminals such as a Local 3790 terminal 216 and a Local 3270 terminal 218. In addition, VTAM is also connected to the local communications controller 220 which may be referred to as NCP which in turn is connected to remote communications controllers 222, terminals on switched lines 224 and terminals on nonswitched lines 226.

The SNA network architecture and VTAM are described in detail in "Systems Network Architecture," Concepts and Products, IBM, GC30-3072-3, "VTAM Concepts," Independent Study Program, IBM, 1982; and Chapter 1 of the textbook entitled "Computer Networks" by Tanenbaum, Prentice Hall, Inc. (2d ed., 1988), all of which are incorporated herein by reference. VTAM also is described in detail in U.S. Pat. No. 4,586,134 entitled "Computer Network Systems and Its Use for Information Unit Transmission" and U.S. Pat. No. 5,027,269 entitled "Method and Apparatus for Providing Continuous Availability of Applications in a Computer Network," both of which are also incorporated herein by reference.

The movement of data in most communications systems can have a severe impact on the efficiency of the system. As the number and frequency of data transmissions increase, the utilization of components of a processor, such as a memory bus and central processing unit, significantly increase. The total throughput supported by the communications system may be severely limited when the inefficient use of a component causes the utilization of that component to reach maximum capacity.

Notwithstanding the negative effect on system performance caused by the transmission of large data objects, the industry trend is to transmit these large objects across a communications system using a single transmit operation whenever possible. Transmission of large objects occurs particularly in applications relating to multimedia, image and large file transfer. Once an application designates a relatively large data object to be transmitted to another node in the communications system, the relatively large data object is processed through the communications stack as a single large buffer for transmission across the network and may contain one or more network packets. Utilization of a single transmit buffer for multiple network packets allows for transmission of multiple network packets via a single transmit operation.

During processing of the relatively large data object in the communications stack from the transaction services layer 114 through the physical control layer 102 (see FIG. 3), the relatively large data object may be segmented into smaller data objects due to network restrictions on maximum transmission sizes. In addition, headers containing protocol specific information may be added at the different layers of the communications stack to the relatively large data object and/or to the newly created segments of relatively smaller data objects. Each newly created header and associated data segment are passed down to the next layer in the communications stack separate and apart from other headers and data segments. One method and system for segmenting relatively large data objects into relatively small data objects and associated headers is that described in U.S. patent application Ser. No. 08/802,597 filed concurrently with the present application and entitled "Systems and Methods for Managing the Processing of Relatively Large Data Objects in a Communications Stack," which is assigned to IBM, the assignee of the present invention, and incorporated herein by reference.

In order to accomplish the goal of transmitting large data objects (e.g., multiple data segments and associated headers) across a channel of the communications system, the headers and associated data segments may be combined into a large datastream for transmission across a channel of the communications system once the headers and associated data segments reach the physical control layer 102 (see FIG. 3). This requires loading a write transmit buffer to maximum capacity by moving or copying the headers and associated data segments into the write transmit buffer and utilizing the system I/O interface 28 (see FIGS. 1 and 2) in order to send as much data as possible across the channel of the communications system using a single write command. Thus, for those data segments and associated headers which originated from the same relatively large data objects, data blocking in a single write transmit buffer in an attempt to maximize use of system resources results in data movement or copying.

Resource sharing is another current trend used in an attempt to improve system performance when supporting multiple users. Resource sharing for supporting multiple users is often implemented through multiplexing and de-multiplexing of datastreams at the system I/O interface 28 (see FIGS. 1 and 2). An example of a system I/O interface is the IBM 390 system I/O interface developed by IBM, the assignee of the present invention.

Complications arise, however, as a result of efforts to share resources. Data obtained from different sources which is to be transmitted across a channel of a communications system is combined by copying the data into a single write transmit buffer or input/output operation buffer to allow for more efficient use of both the central processing unit and the input/output facilities. This is often achieved through the use of "multiplexing." Typically, multiplexing requires that the data be moved or copied into a single data buffer that is used to construct a single datastream for transmission across a channel of the communications system. This data movement is sometimes referred to as "data blocking." Numerous data movements occur during "data blocking," which may severely impact the performance level in the communications stack and the communications system.

In order to improve the performance of applications, such as multimedia applications, which process and transmit large data objects between nodes in a communications system, data movement and copying during processing in the communications stack and between nodes in the communications system should be eliminated, or at least significantly reduced. One solution for avoiding, or at least reducing, data movement and copying is to transmit the separate headers and associated data segments as individual headers and data segments across a channel of the communications system. Similarly, it is known to build datastreams by moving the separate header and data segments into a datastream in a sequential fashion such that each header segment is contiguous with its corresponding data segment. However, many communications systems have restrictions on memory addressing in an attempt to maintain optimal performance in a communications system.

An example of a restriction on memory addressing is a restriction on addressing "boundary" requirements. For example, there may be a 2K byte boundary requirement. In this example, assume a header having a length of 50 bytes is stored at Address 1000. The corresponding data having a length of 20K bytes is stored at Address 5000. Separate buffer list entries are required to reference the header and the data. The possible restrictions that may exist in a communications system for this example are as follows: The buffer list of pointers to the actual data must point to data having a length of 20K bytes in 2K byte increments, with the 20K byte long data segment being aligned on 2K byte boundaries. The only exceptions to this boundary requirement are that the first entry does not have to be 2K bytes in length and does not have to start on a 2K byte boundary, but must end on a 2K byte boundary; and the last entry does not have to be 2K bytes in length and does not have to end on a 2K byte boundary, but must start on a 2K byte boundary. If the header is stored separately from its corresponding data segment, a separate buffer list for the header segment is required because a separate buffer list is required for every different address area.

In the above example, if two segments are to be transmitted across the communications system, with each segment containing a header and corresponding data, avoidance of data moves to construct a single list with all four entries (i.e., header segment no. 1, data segment no. 1, header segment no. 2, and data segment no. 2) generally cannot be accomplished without violating the buffer list address rules (i.e., the 2K byte boundary restrictions).

One prior art alternative is to copy all of the header and data segments into a single transmission buffer such that the transmission buffer contains: header segment no. 1; data segment no. 1; header segment no. 2; data segment no. 2; . . . header segment no. n; data segment no. n. The single transmission buffer is then transmitted across the channel.

Another alternative approach for reducing data movement while taking into account communications system's address restrictions is to provide a separate buffer list for each segment containing a header and associated data that is to be transmitted across a channel of the communications system. As a result, no copying or movement of the data occurs. This, however, results in excessive waste of storage and space in buffers being transmitted across a channel and in possible excessive utilization of input/output procedures since no data blocking occurs.

Still another alternative approach previously used in an attempt to implement data blocking without moving or copying data and preparing the data for transmission across a channel is to copy the header, regardless of its size, into 2K byte storage areas separate and apart from the associated data segment. As a result, the storage area containing the header also contains a large amount of "garbage" data. The header along with the "garbage" data is transmitted across the channel separate from the data in order to maintain the boundary alignment.

Unfortunately, these prior art alternatives may still fall short of solving the data copy and movement problem while adhering to communications system's memory restrictions. For example, these prior art alternatives may require additional buffer lists which result in additional write operations. Furthermore, these prior alternatives also may cause large amounts of "garbage" data to be transmitted in order to maintain alignment in accordance with address boundary restrictions. Thus, storage is wasted. Still further, transmission of "garbage" data may generally have a negative impact on node and communications system performance.

In addition, the prior art may require the communications stack to get new storage units or buffers during processing without regard to the size of the data segments and headers. This, however, may result not only in excessive waste of storage since the segment sizes may bear no relationship to the overall size of the relatively large data object, but also may severely impact the performance in the communications stack due to the numerous data copies and movements.

SUMMARY OF THE INVENTION

It is, therefore, an object of the present invention to provide methods, systems and computer program products for managing the transmission of relatively large data objects in a communications system while improving the performance of the communications system.

It is another object of the present invention to provide methods, systems and computer program products for managing the transmission of data across a communications system through data blocking while reducing data movement and copying.

These and other objects are provided according to the present invention by a system for improving the performance in a communications system relating to the transmission of large data objects between nodes, and in particular, by a system for improving the performance of processing numerous data segments prior to their transmission across a channel of the communications system.

Managing the processing of numerous data segments prior to transmission of the data segments across a channel is accomplished by designating part of the datastream being constructed to contain control or primal data while continuing to implement data blocking in order to avoid waste of storage. At the data link control layer of the communications stack, control or primal data is copied into a datastream header area, datastream buffer list entries for referencing the control or primal data in the datastream buffer are generated and datastream buffer list entries for referencing the segments of application data or static data are generated. The application data segments are only referenced by the entries in the datastream buffer lists. As such, no movement or copying of the application data occurs.

For example, assume that the maximum amount of data (i.e., header and application data) that can be transmitted across a channel using one datastream buffer list is 64K bytes. The 64K byte datastream can be divided into a datastream header area and a datastream data area where the datastream header area is 4K bytes in length and the datastream data area is 60K bytes in length. The datastream header area contains multiple headers generated by the communications stack while the datastream data area contains multiple application data segments also generated by the communications stack. Each application data segment corresponds to a specific header in the datastream header area. As such, the present invention allows the construction of a datastream at the time of transmission, the datastream having a datastream header area and a datastream data area. The datastream header area and the datastream data area form a single linear bit stream in which the header segments and data segments are not contiguously contained in the datastream, and from which network data elements may be constructed by some remote node.

The present invention stems from the understanding that data may need to be combined into a single datastream (i.e., blocked) in order to reduce waste of storage in the datastream as it is transmitted across a channel of a communications system. In addition, it is also understood that communications systems may provide restrictions on memory addresses and memory boundaries which conflict with the need to block data. Still further, it is understood that the blocking of data while adhering to various communications system's restrictions may result in excessive movement and copying of data. If the movement and/or copying of the header and data segments can be eliminated, or at least reduced, performance may be enhanced.

Thus, data is processed in the communications stack in preparation for transmission across a channel of a communications system by the system I/O interface according to the present invention by constructing a "virtual" datastream at the data link control layer using data blocking while reducing movement or copying of data and adhering to memory boundary restrictions. Multiple data segments and corresponding header segments are received at the data link control layer from a higher layer in the communications stack. The multiple header segments are copied into the datastream header area such that the header segments are sequentially stored in the datastream header area. A datastream buffer list having entries referencing the header segments in the datastream header area is generated. Datastream buffer list entries referencing data segments received from a higher layer are also stored in the datastream buffer list. The data segments are not physically moved or copied into the datastream data area at the data link control layer before transmission, but rather are only copied directly into the channel of the communications system at the system I/O interface. As a result, only a "virtual" datastream is generated before transmission by the communications stack and the physical movement or copying of the data is reduced.

The datastream which is actually transmitted across the channel is generated by the system I/O interface at the time of transmission by using the datastream buffer list entry to access a header segment stored in the datastream header area and writing those header segments directly into the channel. After all of the header segments referenced by the datastream buffer list have been written into the channel, the data segments (which have not been previously copied) are written directly from their original storage location into the channel of the communications system using the corresponding datastream buffer list entries, thereby reducing intermediate copying of data while implementing data blocking. The result is a datastream having "out-of-band" headers (i.e., headers which are located in the datastream discontiguously from their corresponding data segments).

The datastream header area is constructed to contain only control or primal data. This control or primal data may sometimes be referred to as "discontiguous protocol data unit headers" or "discontiguous PDUs." The primal data, such as network protocol headers, reside in the datastream header area along with, but not necessarily contiguous to, the discontiguous PDU headers. There may be as many references into the datastream as required by any single discontiguous PDU header in order to maintain data association. This associative nature can be maintained across a single stream or multiple streams as long as the control nature of the datastream data area is maintained.

The datastream data area always begins at a predetermined page boundary denoted by the end of the datastream header area. This creates a constant offset for the beginning of the data portion of the datastream. Data may be of any length consistent with the current maximum buffer sizes being utilized. As such, any data message to be transmitted may fill any amount of the datastream, up to the maximum receiver buffer size minus the datastream header area size.

Finally, the data link control layer also receives via the system I/O interface the actual datastream transmitted across a channel of the communications system, and disassembles the datastream in order to reassociate the individual headers and their corresponding data segments. Once a header segment and its corresponding data segment have been disassembled from the datastream received on the channel, the header segment and the corresponding data segment are queued to a higher layer in the communications stack for processing. This disassembly process is continued until the entire datastream received on the channel has been disassembled into individual header segments and corresponding data segments and each header segment and corresponding data segment has been queued to a higher layer in the communications stack.

DESCRIPTION OF THE PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Figure 5:
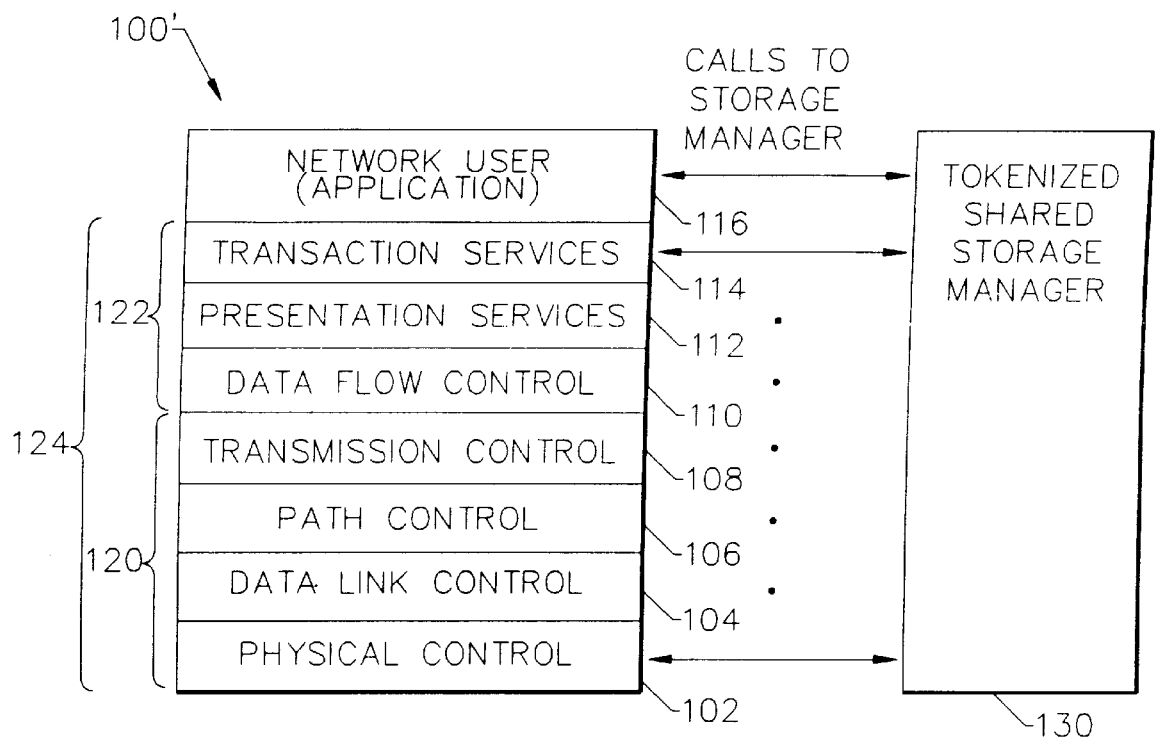
FIG. 5 is a schematic block diagram illustrating the network protocol layers of a communications stack from a computer software perspective for the SNA architecture in communications with the tokenized shared storage manager according to the present invention.

The invention is described in an environment which is substantially based upon the IBM SNA architecture and VTAM access method. In the SNA architecture environment, each layer 102–116 of the SNA network communicates directly with the tokenized shared storage manager 130 of the present invention as illustrated generally at 100' in FIG. 5. The management of processing of numerous individual header segments and corresponding data segments into a discontiguous datastream and the corresponding disassembly of the datastream according to the present invention can take place at any layer in the communications stack. In the preferred embodiment, these operations take place at the data link control layer 104 (see FIG. 5). Notwithstanding the above, the present invention is applicable to any type of network or network architecture which requires segmentation of relatively large data objects and/or the appendage of headers containing protocol specific information to each data segment as the large data object proceeds through the layers of the communications stack.

Figure 1:
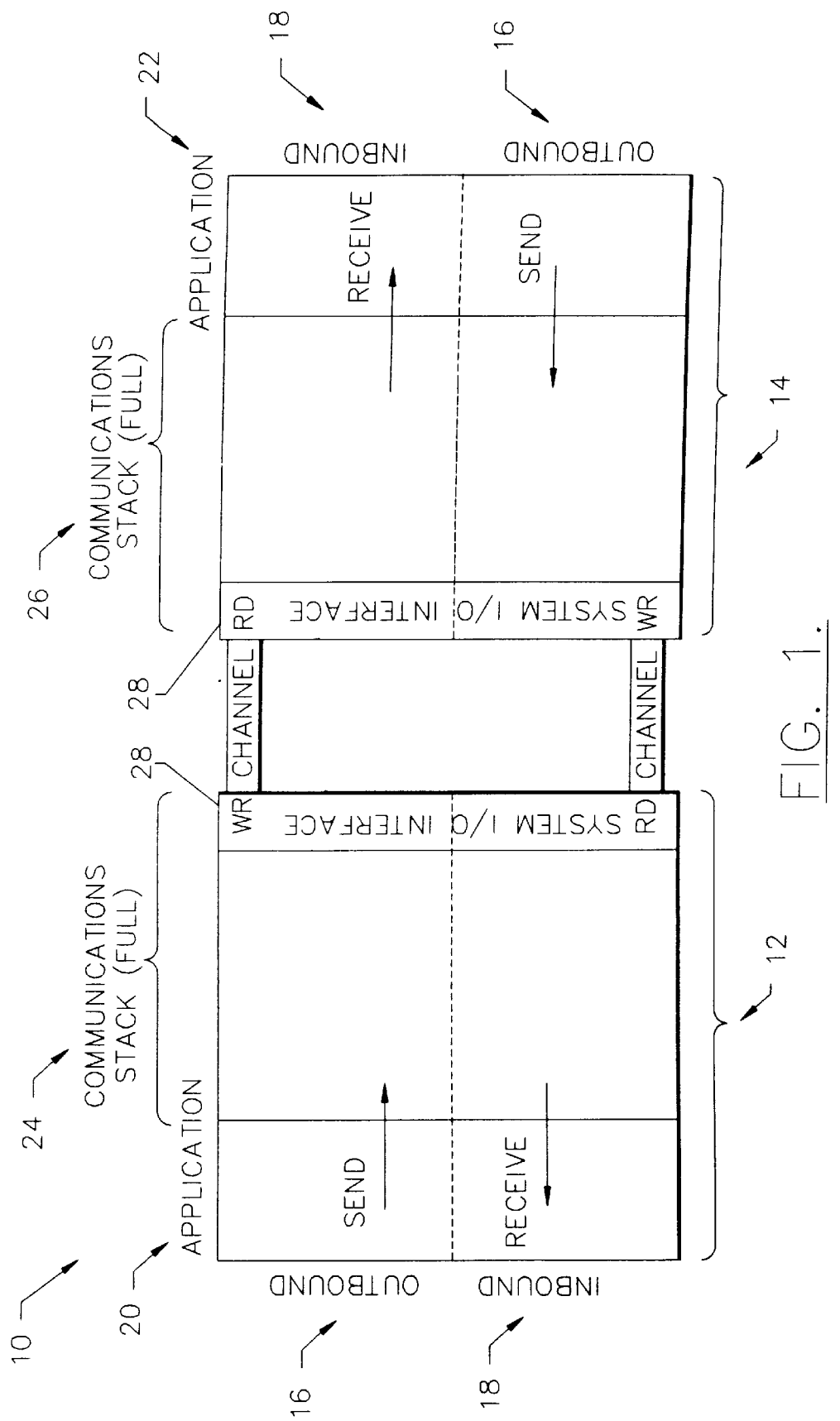
FIG. 1 is a block diagram of an application-to-application communications network with two host computers in a direct-attached environment.
Figure 2:
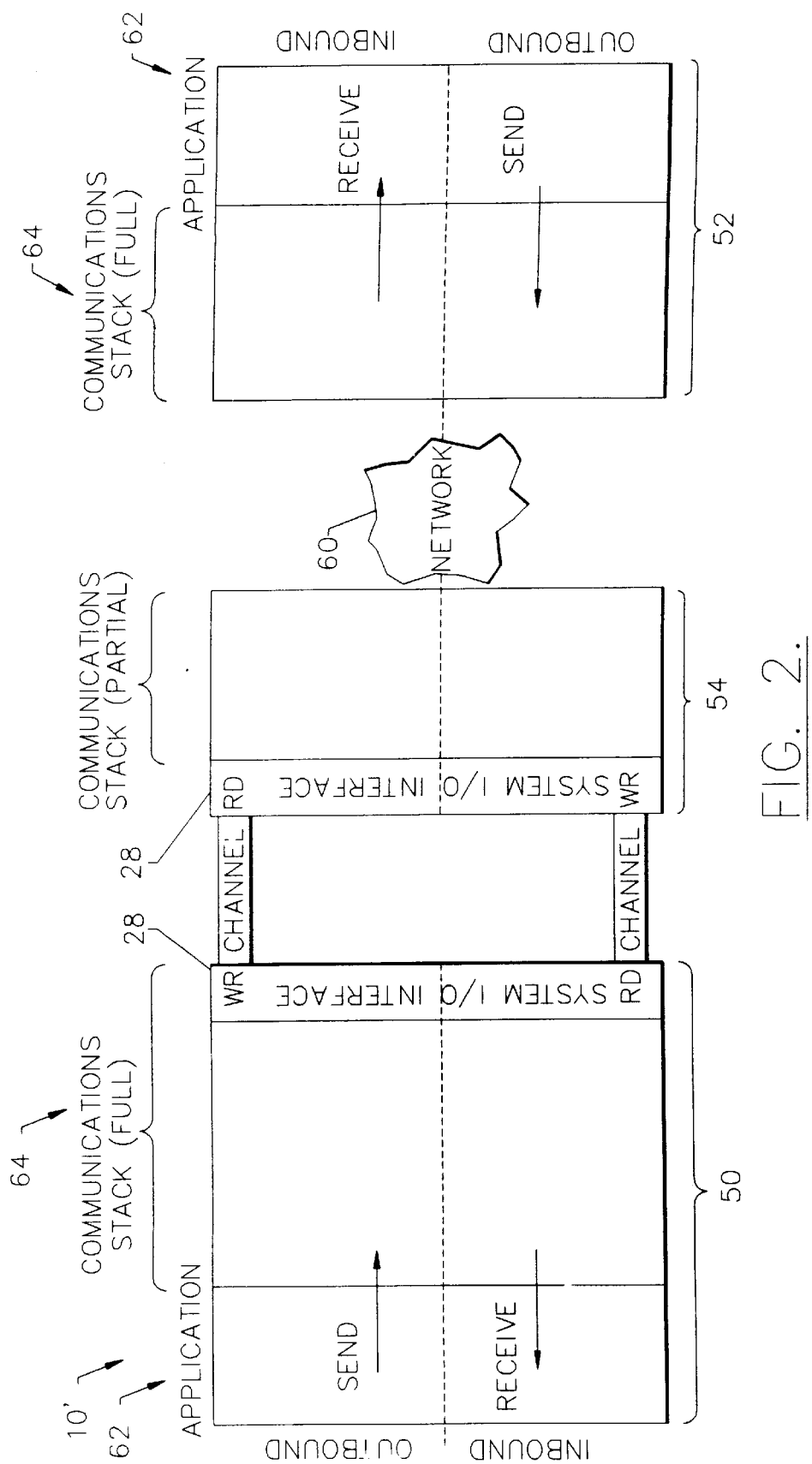
FIG. 2 is a block diagram illustrating the components of an application-to-application communications network with two host computers and a network controller.
Figure 3:
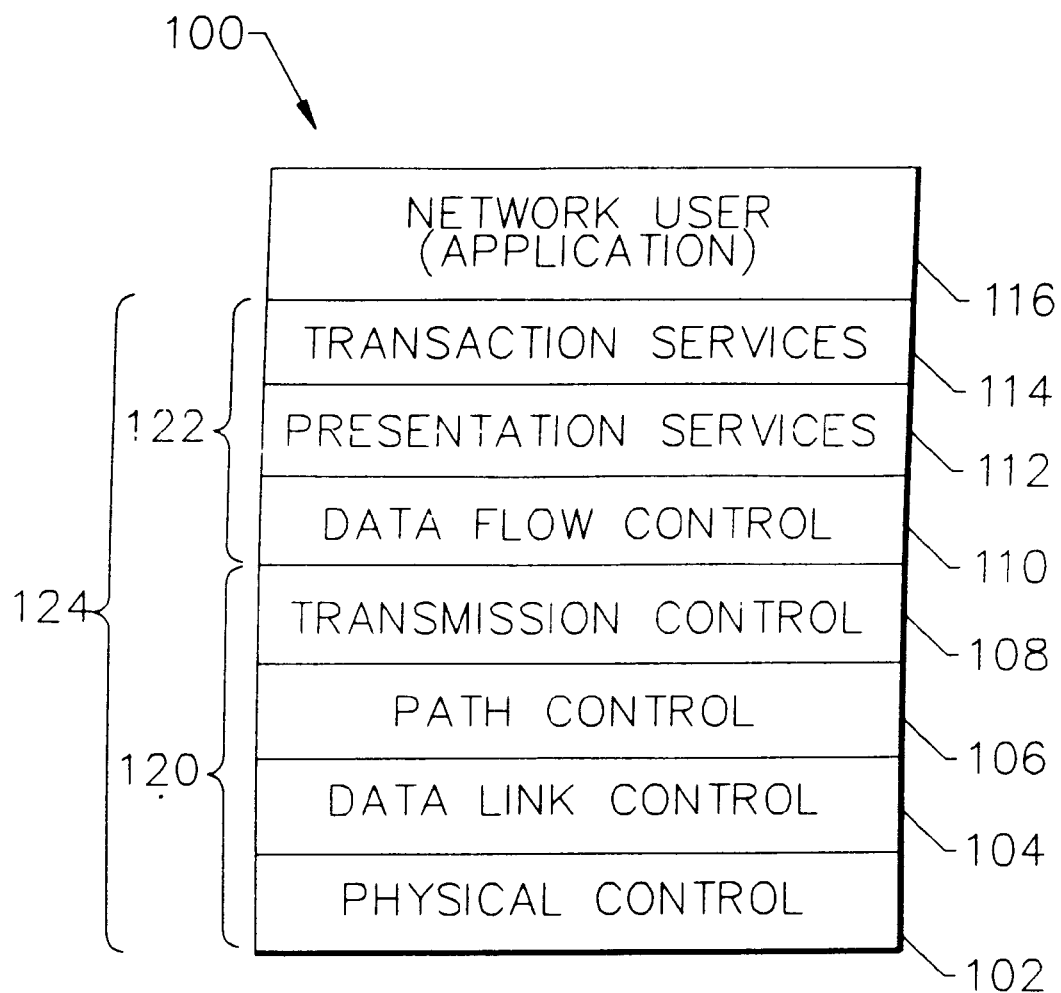
FIG. 3 is a schematic block diagram illustrating the network protocol layers of a communications stack from a computer software perspective for the System Network Architecture implementation of a communications system at a particular node on an application-to-application communications network such as that illustrated in FIG. 1.
Figure 4:
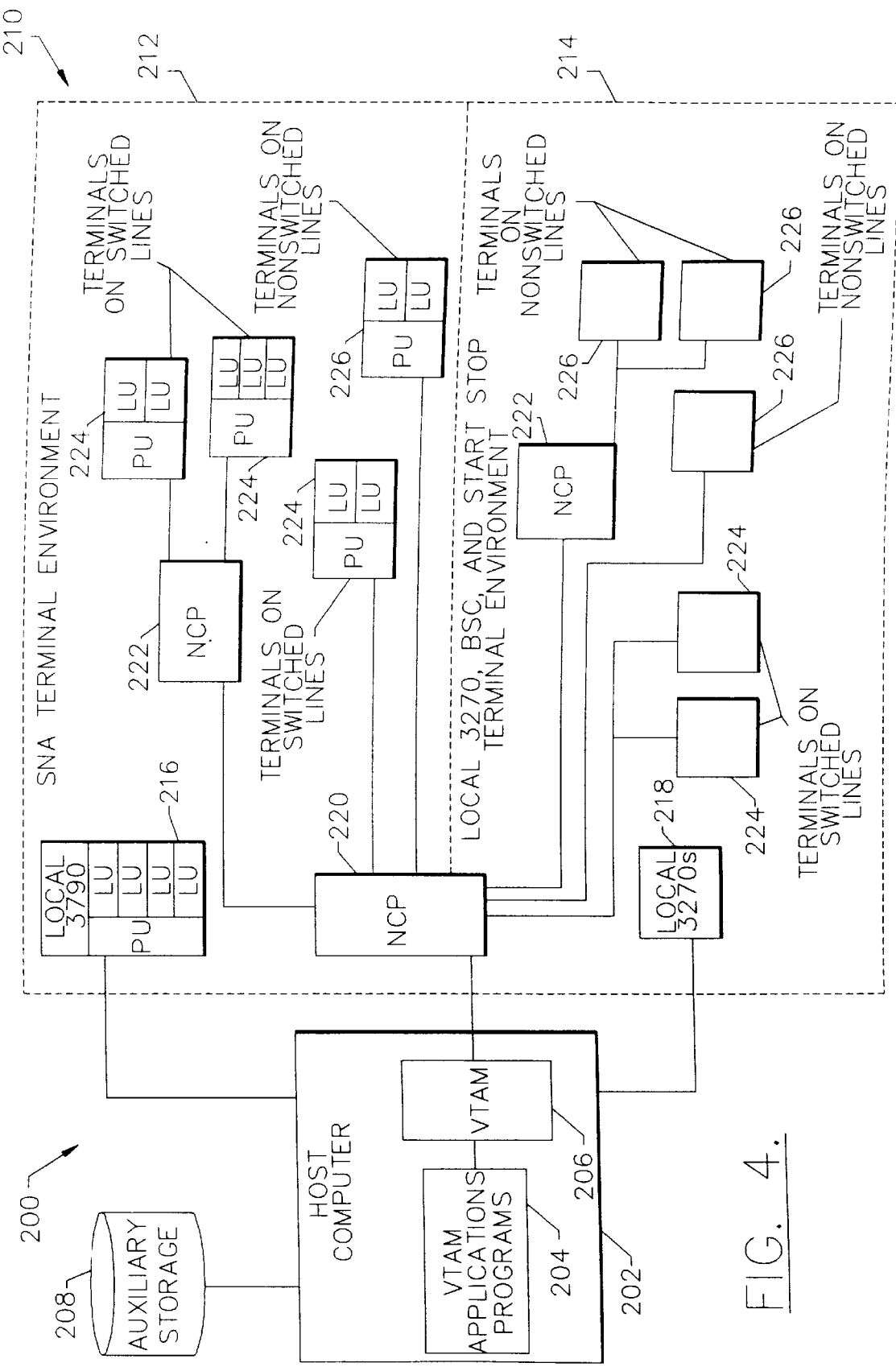
FIG. 4 is a block diagram of the major components of a VTAM system for a communications system capable of implementing the SNA architecture illustrated in FIG. 3.
Figure 6A:
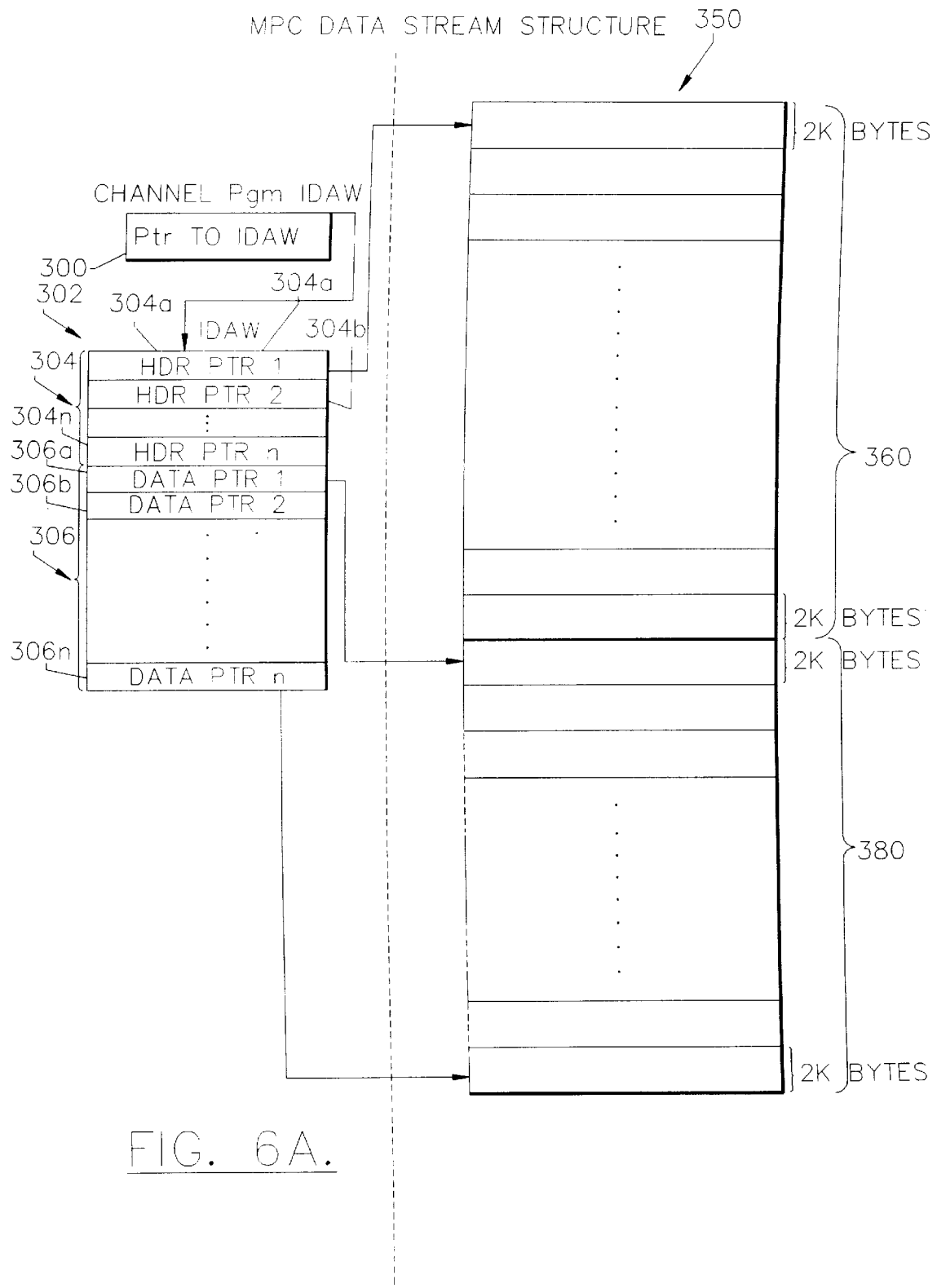
FIGS. 6A and 6B are block diagrams illustrating the IDAW datastream buffer list and the discontiguous datastream containing a datastream header area and a datastream data area according to the present invention.
Figure 6B:
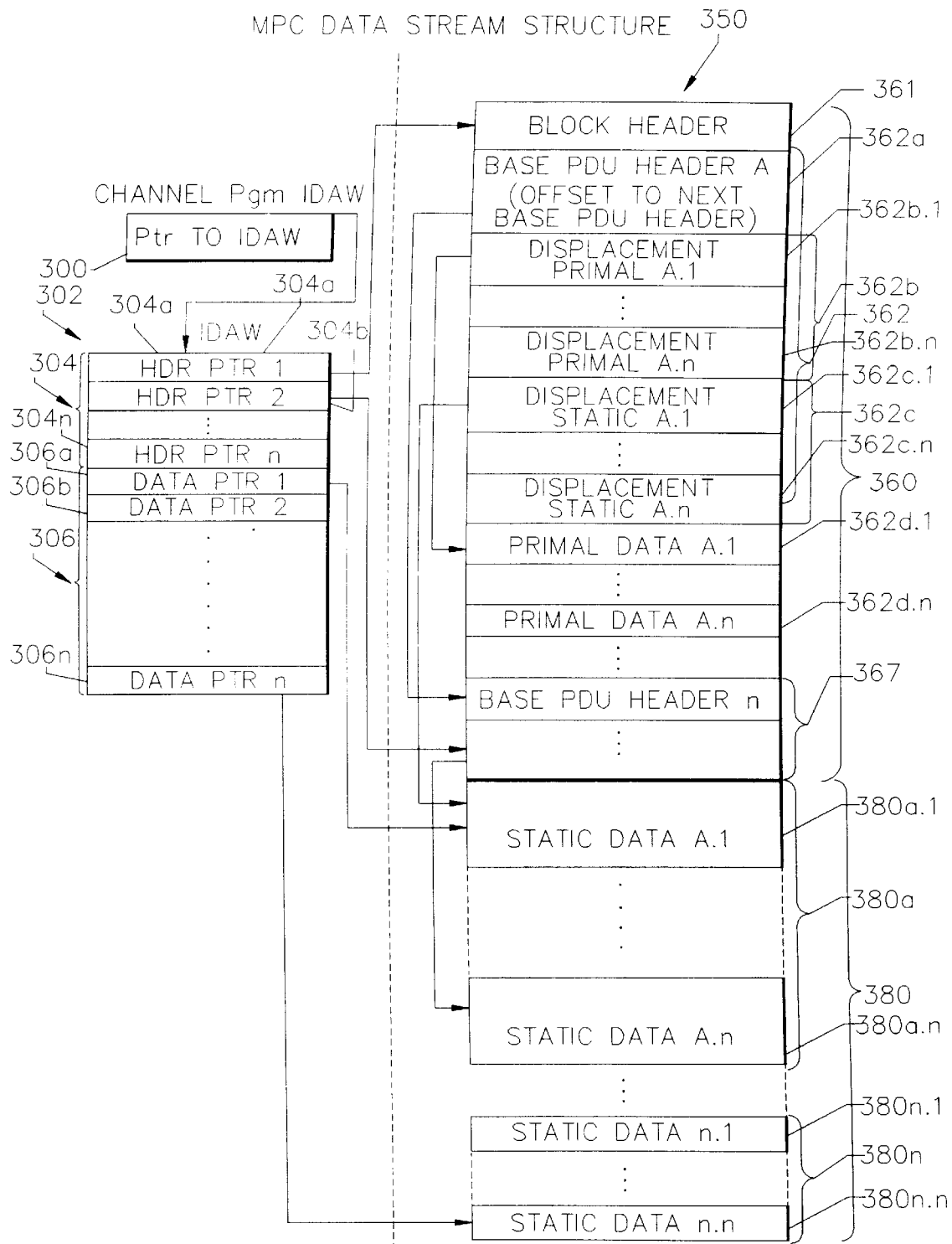

Referring to FIGS. 6A and 6B, block diagrams illustrating the multipath channel ("MPC") datastream structure according to the present invention are shown. In particular, the indirect address word ("IDAW") datastream buffer list and the discontiguous datastream containing a datastream header area and a datastream data area are illustrated. While the discontiguous datastream 350 (i.e., MPC datastream) is transmitted across a channel of the communications system, IDAW buffer list 302 is not transmitted across a channel of the communications system. Furthermore, MPC datastream 350 illustrates the MPC datastream as it is transmitted across a channel by the system I/O interface 28 (see FIGS. 1 and 2). It does not illustrate the storage location of the datastream components on the host computer prior to transmission of the datastream across a channel.

MPC datastream 350 has two major components, namely, the datastream header area 360 and the datastream data area 380. For the example illustrated in FIG. 6A, MPC datastream 350 has a 2K byte boundary requirement. As a result, in this example, the primal data in the datastream header area 360 and static data in the datastream data area 380 must be aligned on the 2K byte boundaries.

Referring to FIG. 6B, the datastream header area 360 has several parts, including a block header 361 for the entire MPC datastream 350 as well as multiple header segments such as that illustrated at 362. The block header 361 contains administrative data regarding the overall MPC datastream 350 such as length of the datastream.

The IDAW buffer list 302 is a buffer list of pointers to actual data (i.e., header data and applications data). The IDAW buffer list 302 contains pointers to two different types of data, namely, pointers generally referred to at 304 which point to header segments and pointers generally shown at 306 which point to application data segments. IDAW buffer list 302 is pointed to by the channel program IDAW pointer 300. The first pointer in the header portion of the IDAW buffer list (i.e., HDR PTR 1 at 304a) points to block header 361 of the MPC datastream 350. Each subsequent pointer in the header portion 304 of IDAW buffer list 302 (e.g., HDR PTR 2 304b) points to the beginning of another 2K byte portion of the datastream header area. Each pointer in the data pointer portion 306 of the IDAW buffer list 302 points to another 2K byte portion of the datastream data area within the MPC datastream 350. For example, DATA PTR 1 306a points to the beginning of the static data segment 380a in MPC datastream 350.

A header segment (e.g., header segment 362) is provided for each header and corresponding data segment combination received from the communications stack for transmission across a channel of the communications system. Each header segment (e.g., header segment 362) contains a base protocol data unit ("PDU") header (e.g., BASE PDU HEADER A 362a) which contains administrative data relating to the length of the particular header segment as well as an offset 362a to the next base PDU header (e.g., a next header segment 367) in MPC datastream 350. Still further, header segment 362 also contains a displacement 362b to primal data header segment 362d.1 (i.e., PRIMAL DATA A.1) and a displacement 362c to the corresponding static data segments beginning at 380a.1 (i.e., STATIC DATA A.1). Primal data is control data which references network protocol headers such as SNA or TCP/IP headers. Static data refers to the applications data.

The number of primal data entries 362d.1–362d.n will be equal to the number necessary to handle all necessary primal data corresponding to the associated static data. In addition, there will be the same number of displacements 362b to primal data entries (e.g., PRIMAL DATA A.1 362d.1) in the MPC datastream 350 as there are primal data entries 362d in the MPC datastream 350. Each displacement to primal data will uniquely reference a corresponding primal data entry.

Similarly, the number of static data segments will be equal to the number necessary in order to handle the data segments received from the communications stack. There is a unique one-to-one correspondence between each primal data displacement and primal data entry. Similarly, there is a one-to-one correspondence between each static data displacement and static data entry in MPC datastream 350.

FIGS. 7–11 are block diagram, flowchart and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Figure 7:
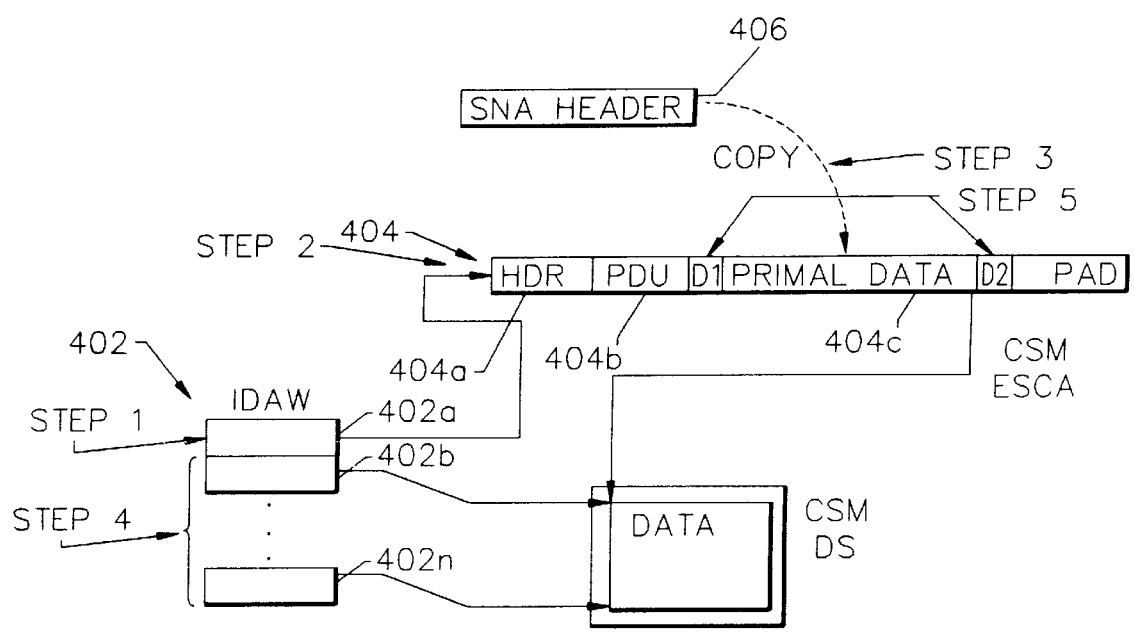
FIG. 7 is a block diagram illustrating the processing of header segments and corresponding data segments according to the present invention, including the generation of the IDAW datastream buffer list prior to transmission of the datastream containing discontiguous header segments and data segments across a channel of a communications system.

Referring to FIG. 7, a block diagram illustrating the processing of header segments and corresponding data segments, including the generation of the IDAW datastream buffer list at the data link control layer prior to transmission of the datastream is shown. The generation of the IDAW datastream buffer list 302 (see FIG. 6) and building of the "virtual" MPC datastream 350 (see FIG. 6) starts with receipt of a header and corresponding data segments from a higher layer of the communications stack. More than one header segment and its corresponding data segments may be enqueued to the data link control layer. The header and corresponding data segments may be generated by the communications stack as described in U.S. patent application Ser. No. 08/802,597 filed concurrently with the present application and entitled "System and Methods for Managing the Processing of Relatively Large Data Objects in a Communications Stack," which is assigned to IBM, the assignee of the present invention, and incorporated herein by reference.

At Step 1 of FIG. 7, the data link control layer obtains storage for the datastream header area and stores the pointer to the address for the datastream header area as a pointer in the first entry 402*a* of the IDAW datastream buffer list illustrated generally at 402. Thereafter, the data link control layer then begins building the datastream header area 404 at the location pointed to by the first entry 402*a* in the IDAW buffer list 402 at Step 2. The data link control layer builds the datastream header area by building the block header at 404*a* and the base PDU header at 404*b*. Thereafter, the data link control layer copies the SNA or other protocol header 406 received from a higher layer of the communications stack into the primal data portion 404*c* of the datastream header area at Step 3.

The data link control layer, using the SNA or other protocol header 406 and the communications stack internal buffer list corresponding to the SNA header and its corresponding data segment received from the communications stack, then stores the pointers to the addresses of the data segments in 2K byte increments as entries in the IDAW buffer list 402*b*–402*n* at Step 4. Thereafter, the data link control layer stores displacements to the primal data (i.e., D1) and to the data segments or static data (i.e., D2) in the datastream header area at Step 5 as indicated in FIG. 7. The communications stack internal buffer list may take the form of the "XBUFLIST" described in U.S. patent application Ser. No. 08/802,597 filed concurrently with the present application and entitled "System and Methods for Managing the Processing of Relatively Large Data Objects in a Communications Stack," which is assigned to IBM, the assignee of the present invention, and incorporated herein by reference.

Figure 8:
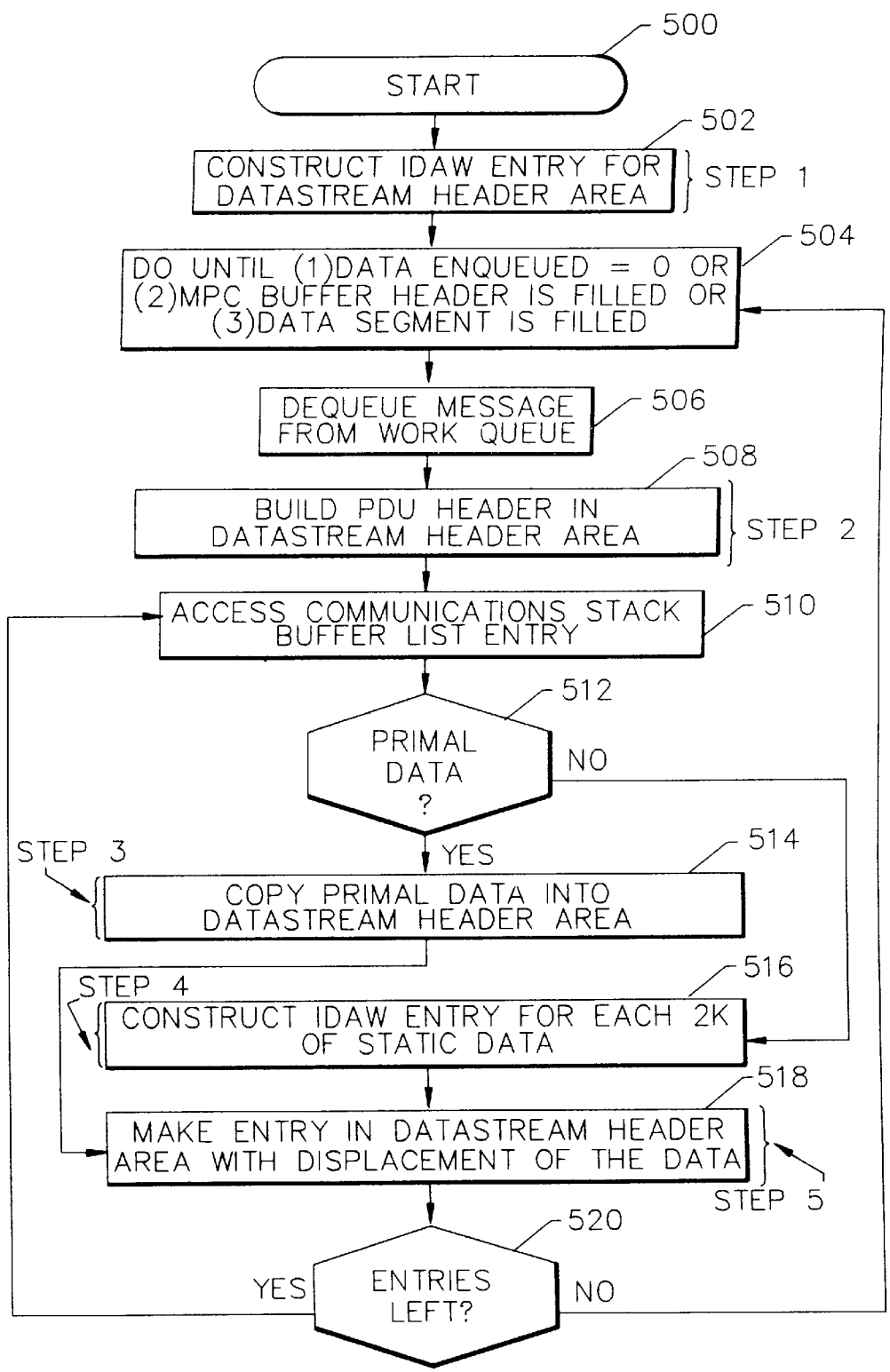
FIG. 8 is a flowchart representation illustrating the operations relating to the processing of numerous header segments and data segments for transmission across a channel of the communications system according to the present invention.

Referring to FIG. 8, a flowchart of the operations relating to the processing of numerous header segments and data segments at the data link control layer in preparation for transmission across a channel of the communications system is illustrated. In summary, FIG. 8 illustrates the construction of the IDAW buffer list 302 (see FIG. 6) and the datastream header area 360 of the MPC datastream (see FIG. 6). The data link control layer begins processing at 500 in FIG. 8, and constructs the IDAW buffer list for the datastream header area at 502. The construction of the IDAW entry for the datastream header area corresponds to Step 1 of FIG. 7. Next, the data link control layer begins processing the header and corresponding data segments received from the communications stack. In particular, processing is continued as illustrated at 504 until one of the following three conditions is met: (1) no more data has been received from the communications stack (i.e., the data enqueued equals zero), (2) the MPC datastream header area is filled, or (3) the datastream data area is filled. The data link control layer de-queues a message (i.e., header and corresponding data segment) which is received from a higher layer of the communications stack for processing at 506. The data link control layer then builds the base PDU header in the datastream header area at 508. This step corresponds to Step 2 of FIG. 7.

Thereafter, the internal buffer list for the header and data segment combination received at the data link control layer from a higher layer of the communications stack is accessed at 510. A determination is made at 512 as to whether the entry in the internal buffer list received from the data flow control layer 110 is primal data. If the entry in the buffer list received from a higher layer corresponds to primal data, then the internal buffer list entry is used to access the corresponding primal data and copy the primal data into the datastream header area at 514. This copying of the primal data into the datastream header area corresponds to Step 3 of FIG. 7. If it is determined at 512 that the entry in the internal buffer list received from a higher layer is not primal data (i.e., rather, it is static data), an entry in the IDAW buffer list is created with the entry pointing to the location of the static data. A separate IDAW buffer list entry is constructed for each 2K bytes of the static data at 516. The construction of the IDAW buffer list entries corresponds to Step 4 of FIG. 7.

Thereafter, the displacement to the data, whether the data is primal data or static data, is stored in the corresponding header segment portion of the datastream header area in the MPC datastream at 518. Storage of the displacement to the data in the datastream header area of the datastream corresponds to Step 5 of FIG. 7. Finally, a determination is made at 520 as to whether any entries remain in the internal buffer list received from a higher layer of the communications stack. If entries remain in the internal buffer list received from a higher layer, control is returned to step 510 to process the additional entries in the internal buffer list. If no entries remain in the internal buffer list received from a higher layer, control is returned to 504 to continue processing until either no additional data remains in the queue, the datastream header area is full or the datastream data area is full.

Figure 9:
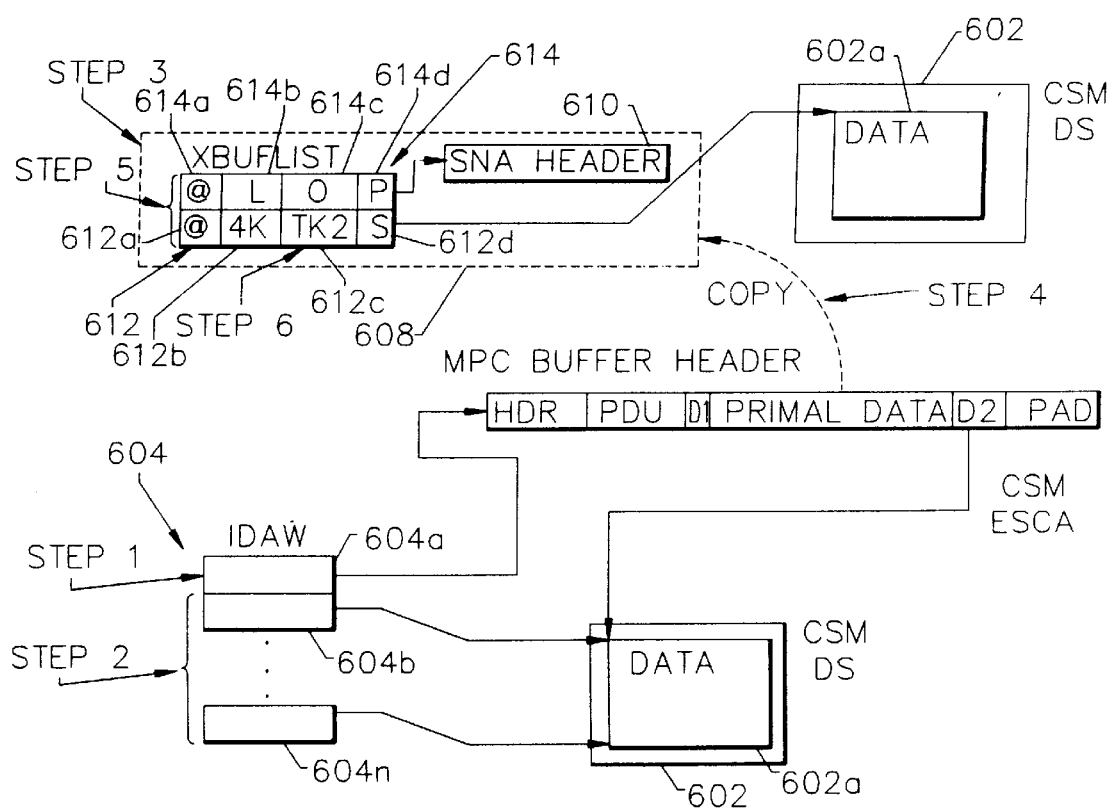
FIG. 9 is a block diagram illustrating the disassembling of a discontiguous datastream received on a channel of a communications system into individual header segments and corresponding data segments for processing by a communications stack according to the present invention.

Referring to FIG. 9, a block diagram illustrating the reassembly of the data and corresponding headers upon receipt of the MPC datastream from a channel on the communications system is shown. In particular, FIG. 9 illustrates the building of the IDAW buffer list and the building of the communications stack internal buffer list by the data link control layer at the receiving node in the communications system. FIG. 9 illustrates the data storage area maintained by the storage manager at 602 (i.e., the "CSM DS" or the communications storage manager data storage). The data storage area illustrated at 602 contains shared memory buffers requested by the data link control layer from the storage manager.

At Step 1 of FIG. 9, the data link control layer begins constructing the IDAW buffer list 604 in order to receive the MPC datastream 350 (see FIG. 6) across the channel of the communications system. The data link control layer begins constructing the entries in the IDAW buffer list in 2K byte increments at Step 1 by entering references to the datastream header area of the datastream into the IDAW buffer list at 604a. Thereafter, the data link control layer begins constructing the entries in the IDAW buffer list in 2K byte storage increments by entering references to the MPC datastream data area portion of the datastream into the IDAW buffer list at 604b–n.

At Step 3 of FIG. 9, once the data is read from the channel, the data link control layer reserves a block of storage for each received header and associated data segments as illustrated at 608. Thereafter, the data link control layer obtains the primal data (e.g., the SNA header) from the datastream header area of the MPC datastream and copies it at Step 4 into the block of storage at 610 of the block of storage 608 reserved by the data link control layer. At Step 5 of FIG. 9, the data link control layer then generates the internal buffer list corresponding to the static data stored at 602a received across the channel and the SNA header stored at 610. The buffer list entry is built for both the static data and for the primal data. The buffer list entry for the static data is built at Step 6 generally at 612 by storing the address of the buffer or an offset into the buffer containing the static data at 612a, the length of the static data stored in the buffer at 612b, the primary token or secondary token, designated as "TK2" in this example, at 612c and an indication that the segment is "static" (e.g., "S") at 612d.

An internal buffer list entry for the primal data (i.e., SNA header) 614 is also built. The internal buffer list entry for header 610 includes, like the other internal buffer list entries, an address at 614a for the location in which header 610 is stored in the internal communications stack storage 608. In addition, the communications stack stores the length of header 610 at 614b of the internal buffer list entry, places a zero at 614c of the internal buffer list entry indicating that there is no token for this buffer list entry, and indicates that the data stored at 610 is "primal" (e.g., "P") at 614d. Once the internal buffer list is built, this buffer list can be queued for processing at a higher layer of the communications stack.

Figure 10:
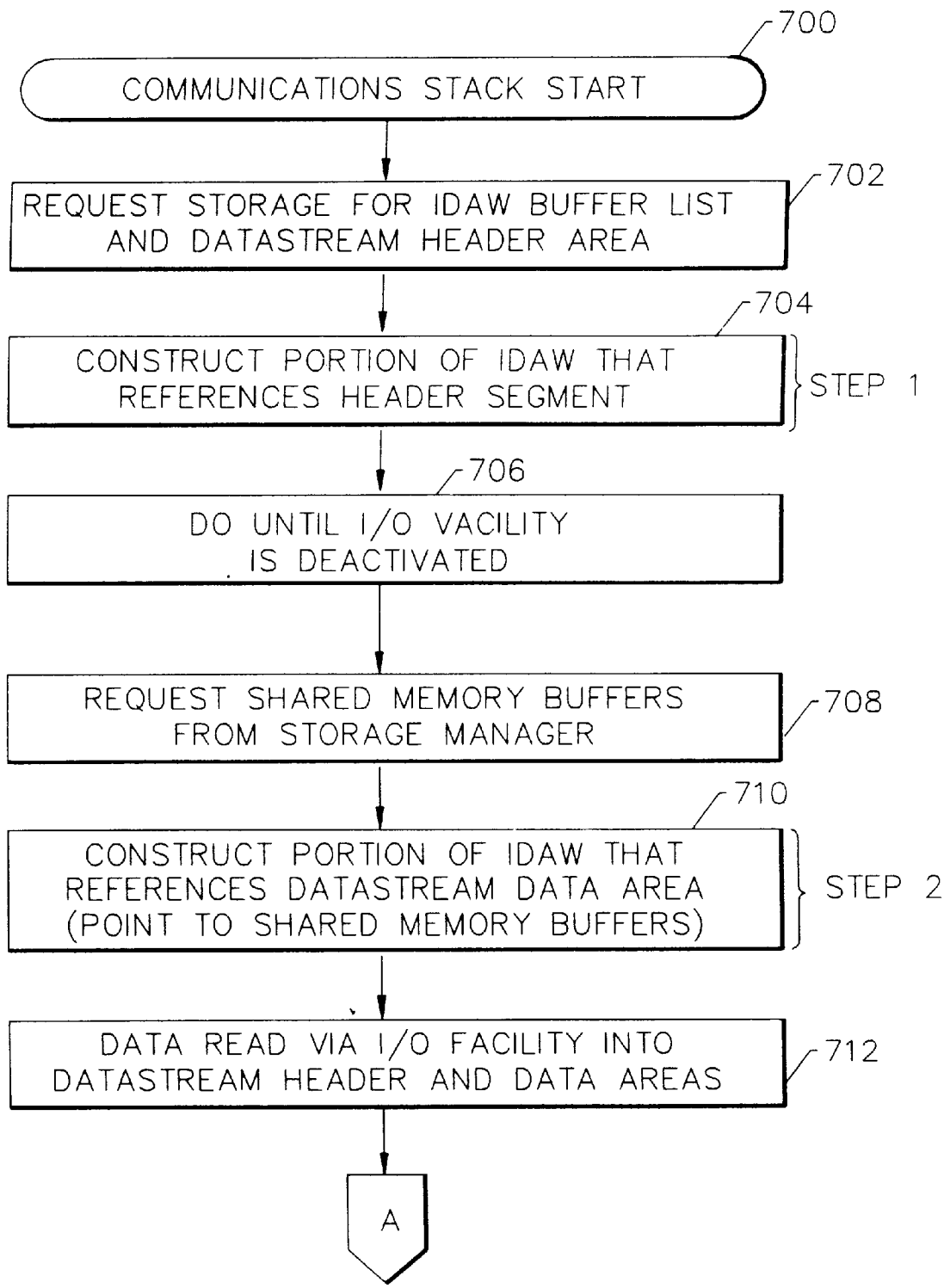
FIGS. 10 and 11 are flowchart representations illustrating the operations relating to the disassembly of a discontiguous datastream received on a channel of a communications system into individual header segments and corresponding data segments for processing by the communications stack according to the present invention.
Figure 11:
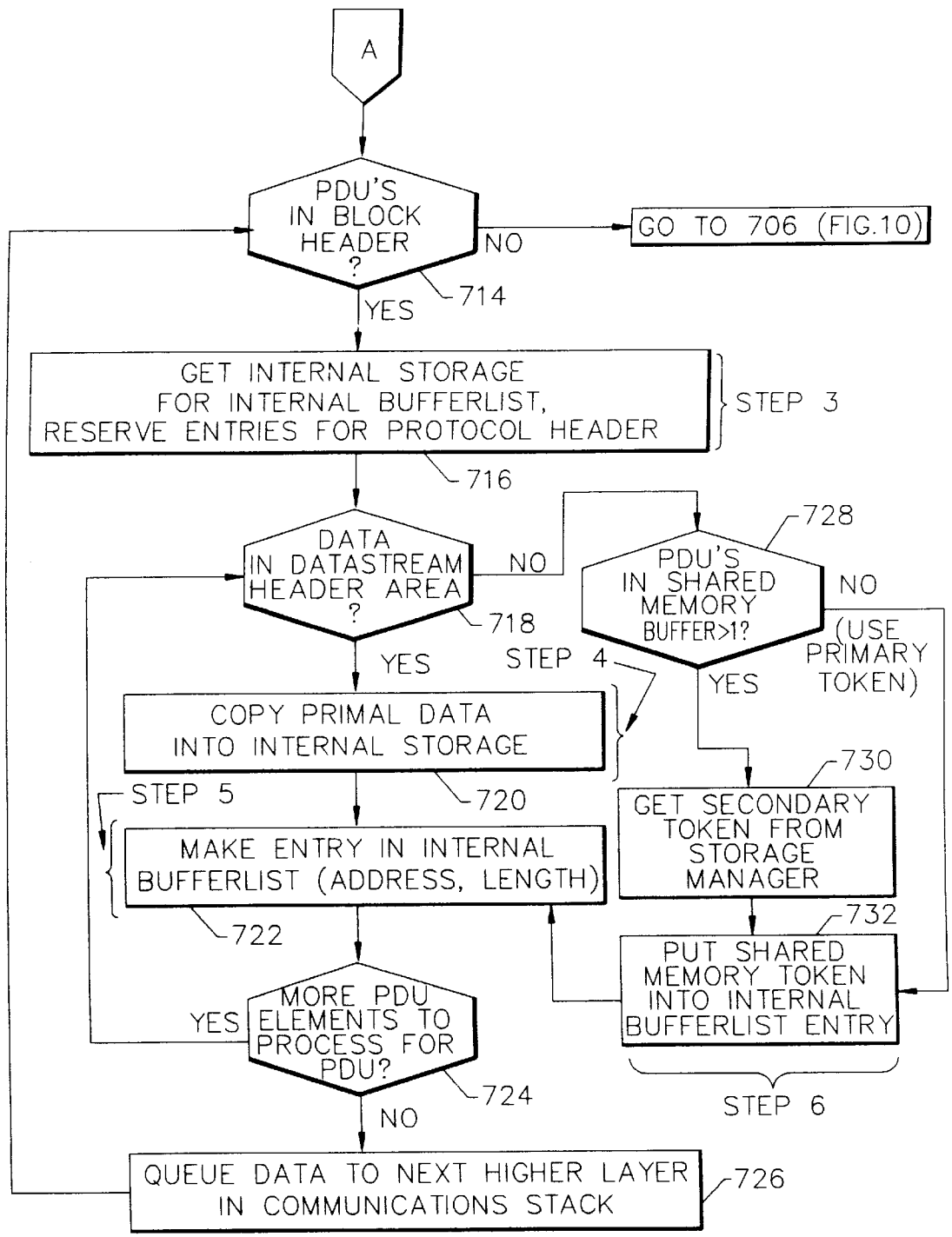

Referring to FIGS. 10–11, a flowchart illustrating the disassembly of a discontiguous datastream (i.e., "out-of-band" header datastream) received on a communications system channel into individual header segments and corresponding data segments for processing by a communications stack will now be described. The data link control layer of the communications stack begins the disassembly process at 700 and requests storage for the IDAW buffer list and the datastream header area at 702. Thereafter, the communications stack constructs the portion of the IDAW buffer list that references the datastream header area of the datastream which will be read at 704. The construction of the entries of the IDAW buffer list referencing the datastream header area of the MPC datastream corresponds to Step 1 of FIG. 9. The communications stack then begins processing the actual header segments in the datastream at 706 until the I/O facility is deactivated.

Before reading data from a channel, the data link control layer requests shared memory buffers from the storage manager at 708. The communications stack then constructs the portion of the IDAW buffer list that references the datastream data area (i.e., static data) at 710. These entries in the IDAW buffer list point to the shared memory buffers. Construction of the IDAW buffer list entries referencing the datastream data area corresponds to Step 2 of FIG. 9. The communications stack then reads the data (i.e., the primal data and the static data) via the input/output facility into the header and data segment areas at 712. The communications stack then proceeds to process the individual PDU headers from the datastream header area of the MPC datastream.

If it is determined at 714 that no PDU headers remain in the datastream header area of the MPC datastream, control is returned to 706 to prepare for the receipt of another datastream. Otherwise, the communications stack allocates storage internal to the communications stack for building the communications stack internal buffer list at 716, thereby reserving entries for the protocol headers. The allocation of storage internal to the communications stack at 716 corresponds to Step 3 of FIG. 9.

A determination is then made at 718 as to whether there is primal data in the PDU header segment of the datastream. If it is determined at 718 that there is primal data in the datastream header area, the communications stack copies the primal data into the internal communications stack storage at 720. The copying of the primal data into the internal communications stack storage at 720 corresponds to Step 4 of FIG. 9. Thereafter, the communications stack generates the buffer list entry for the communications stack internal buffer list by storing the address or offset to the data, the length of the data, and other information at 722. Construction of the internal buffer list entry at 722 corresponds to Step 5 of FIG. 9.

A determination is then made at 724 whether more PDU elements remain to be processed. If no additional PDU elements remain to be processed, the data is queued to the next higher layer in the communications stack at 726 and control is returned to 714 for processing of additional PDUs in the datastream header area. If more PDU elements remain to be processed, control is returned to 718 for processing additional data in the header segment.

If it is determined at 718 that no data is present in the datastream header area, a determination is made at 728 to determine whether more than one PDU is present in the shared memory buffer. If additional PDUs remain in the shared memory buffer, the communications stack obtains a secondary token from the storage manager at 730 and stores the obtained secondary token in the internal buffer list corresponding to the particular data at 732. If it is determined at 728 that no additional PDU headers remain in the shared memory buffer, then the communications stack stores a primary token in the internal buffer list at 732. Storage of the secondary token or primary token in the internal buffer list at 732 corresponds to Step 6 of FIG. 9. Primary and secondary tokens and the internal buffer list are more fully described in U.S. patent application Ser. Nos. 08/802,596 and 08/802,597, filed concurrently with the present application and entitled "Systems and Methods for Controlling the Transmission of Relatively Large Data Objects in a Communications System" and "Systems and Methods for Managing the Processing of Relatively Large Data Objects in a Communications Stack," respectively, which are assigned to IBM, the assignee of the present invention, and incorporated herein by reference.

In the drawings and specification, there have been disclosed typical preferred embodiments of the invention and, although specific terms are employed, they are used in a generic and descriptive sense only and not for purposes of limitation, the scope of the invention being set forth in the following claims.

That which we claim:

1. A method for assembling a plurality of data segments and a plurality of header segments into a datastream for transmission across a network channel, each one of said data segments uniquely corresponding to one of said header segments, and said network channel generally requiring each one of said data segments to be contiguous with the uniquely corresponding one of said header segments to enable efficient transmission of data segments and corresponding header segments across the network channel, said method comprising the steps of:

copying the plurality of header segments into a datastream header area of a datastream buffer, said header segments being sequentially stored in said datastream header area of the datastream buffer;

associating each one of said header segments stored in said datastream header area of the datastream buffer with the one of said data segments corresponding thereto; and generating a datastream buffer list comprising entries referencing said header segments in said datastream header area of the datastream buffer and entries referencing said data segments;

wherein said data segments, said datastream buffer list and said datastream buffer having a datastream header area may be used collectively to form a datastream for transmission across the network channel without physically moving the data segments and without creating a copy of the data segments until transmission of the datastream, said datastream having a datastream header area and a datastream data area such that said header segments in said datastream header area may be discontiguously located in said datastream from the data segments in said datastream data area corresponding thereto and said datastream is formed at the time of transmission of said datastream on said network channel.

2. A method for assembling according to claim 1 wherein said assembling occurs in a communications stack having multiple layers, and wherein said copying step is preceded by the step of: receiving said data segments and said header segments from one layer of said multiple layers in the communications stack.

3. A method for assembling according to claim 2 wherein said communications stack is a communications stack implemented in a virtual telecommunications access method (VTAM) system.

4. A method for assembling according to claim 1 further comprising the steps of:

transmitting the datastream header area having the plurality of header segments across the network channel;

obtaining the plurality of data segments referenced by the datastream buffer list; and transmitting the obtained plurality of data segments referenced by the datastream buffer list across the network channel as a datastream data area;

wherein the combination of said header segments in said datastream header area and said data segments in said datastream data area form the datastream and said header segments in said datastream header area are discontiguously located in said datastream from the data segments in said datastream data area corresponding thereto.

5. A method for assembling according to claim 1 wherein said datastream header area of said datastream buffer has a block header portion, and said copying step is preceded by the step of storing datastream specific information in said block header portion.

6. A method for assembling according to claim 1 wherein said associating step comprises the steps of:

determining the displacement between each one of said header segments in the datastream header area of the datastream and the data segment in the datastream data area corresponding to each one of said header segments; and storing the determined displacement in said datastream header area in association with the one of said header segments corresponding to the one of said data segments.

7. A method for assembling in a communications stack having multiple layers header segments and corresponding data segments from a discontiguous datastream received on a network channel, said received discontiguous datastream comprising a datastream header area having a plurality of header segments and a datastream data area having a plurality of data segments, each one of said data segments uniquely corresponding to one of said header segments, said one of said data segments located in said datastream in a discontiguous relationship to said corresponding one of said header segments, said method comprising the steps of:

generating a datastream buffer list having a header entry referencing one of said header segments in said discontiguous datastream and a data entry referencing one of said data segments in said discontiguous datastream which uniquely corresponds to the one of said header segments;

storing said one of said header segments in a header segment buffer;

storing said one of said data segments in a data segment buffer; and discontiguously passing said one of said data segments and said uniquely corresponding one of said header segments to a second layer in said communications stack, wherein said one of said data segments is passed to the second layer in said communications stack discontiguously from its associated one of said header segments and without physically moving the one of said data segments associated with the one of said header segments and without creating a copy of the one of said data segments associated with the one of said header segments.

8. A method for assembling according to claim 7 wherein the discontiguously passing step comprises the steps of:

generating a communications stack internal buffer list for the one of said data segments, the internal buffer list being uniquely associated with the one of said data segments and the associated one of said header segments; and passing the internal buffer list from one layer in said communications stack to a higher layer in said communications stack, wherein the one of said data segments is passed to the higher layer in said communications stack discontiguously from its associated header segment and without physically moving the one of said data segments associated with the one of said header segments, and without creating a copy of the one of said data segments associated with the one of said header segments.

9. A method for assembling according to claim 8 wherein the generating a communications stack internal buffer list comprises the steps of:

generating a token for representing the one of said data segments, said token being uniquely associated with the corresponding one of said data segments;

generating a buffer list header pointer for uniquely referencing the one of said data segments corresponding to the one of said header segments;

storing the token in the internal buffer list; and storing the buffer list header pointer in the internal buffer list.

10. A method for assembling according to claim 7 wherein the generating step comprises the steps of:

identifying one of said header segments in said discontiguous datastream;

storing a header pointer for referencing the identified one of said header segments in the datastream buffer list;

identifying one of said data segments in said discontiguous datastream which uniquely corresponds to the identified one of said header segments; and storing a data pointer for referencing the identified one of said data segments in the datastream buffer list.

11. A method for assembling according to claim 7 wherein said communications stack is a communications stack implemented in a virtual telecommunications access method (VTAM) system.

12. A system for assembling a plurality of data segments and a plurality of header segments into a datastream for transmission across a network channel, each one of said data segments uniquely corresponding to one of said header segments, and said network channel generally requiring each one of said data segments to be contiguous with the uniquely corresponding one of said header segments to enable efficient transmission of data segments and corresponding header segments across the network channel, said system comprising:

a datastream buffer having a datastream header area;

means for copying the plurality of header segments into the datastream header area of the datastream buffer, said header segments being sequentially stored in said datastream header area of the datastream buffer;

means for associating each one of said header segments stored in said datastream header area of the datastream buffer with the one of said data segments corresponding thereto; and means for generating a datastream buffer list comprising entries referencing said header segments in said datastream header area of the datastream buffer and entries referencing said data segments;

wherein said data segments, said datastream buffer list and said datastream buffer having a datastream header area may be used collectively to form a datastream for transmission across the network channel without physically moving the data segments and without creating a copy of the data segments until transmission of the datastream, said datastream having a datastream header area and a datastream data area such that said header segments in said datastream header area may be discontiguously located in said datastream from the data segments in said datastream data area corresponding thereto and said datastream is formed at the time of transmission of said datastream on said network channel.

13. A system for assembling according to claim 12 wherein said system for assembling is operatively connected with a communications stack having multiple layers, and wherein said system further comprises means for receiving said data segments and said header segments from one layer of said multiple layers in the communications stack.

14. A system for assembling according to claim 13 wherein said communications stack is a communications stack implemented in a virtual telecommunications access method (VTAM) system.

15. A system for assembling according to claim 12 further comprising:

means for transmitting the datastream header area having the plurality of header segments across the network channel;

means for obtaining the plurality of data segments referenced by the datastream buffer list; and means for transmitting the obtained plurality of data segments referenced by the datastream buffer list across the network channel as a datastream data area;

wherein the combination of said header segments in said datastream header area and said data segments in said datastream data area form the datastream and said header segments in said datastream header area are discontiguously located in said datastream from the data segments in said datastream data area corresponding thereto.

16. A system for assembling according to claim 12 wherein said datastream header area of said datastream buffer has a block header portion, and said system further comprises means for storing datastream specific information in said block header portion.

17. A system for assembling according to claim 12 wherein said means for associating comprises:

means for determining the displacement between each one of said header segments in the datastream header area of the datastream and the data segments in the datastream data area corresponding to each one of said header segments; and means for storing the determined displacement in said datastream header area in association with the one of said header segments corresponding to the one of said data segments.

18. A system for assembling in a communications stack having multiple layers header segments and corresponding data segments from a discontiguous datastream received on a network channel, said received discontiguous datastream comprising a datastream header area having a plurality of header segments and a datastream data area having a plurality of data segments, each one of said data segments uniquely corresponding to one of said header segments, said one of said data segments located in said datastream in a discontiguous relationship to said corresponding one of said header segments, said system comprising:

means for generating a datastream buffer list having a header entry referencing one of said header segments in said discontiguous datastream and a data entry referencing one of said data segments in said discontiguous datastream which uniquely corresponds to the one of said header segments;

a header segment buffer;

means for storing said one of said header segments in a header segment buffer;

a data segment buffer;

means for storing said one of said data segments in a data segment buffer; and means for discontiguously passing said one of said data segments and said uniquely corresponding one of said header segments to a second layer in said communications stack, wherein said one of said data segments is passed to the second layer in said communications stack discontiguously from its associated one of said header segments and without physically moving the one of said data segments associated with the one of said header segments and without creating a copy of the one of said data segments associated with the one of said header segments.

19. A system for assembling according to claim 18 wherein the discontiguously passing means comprises:

means for generating a communications stack internal buffer list for the one of said data segments, the internal buffer list being uniquely associated with the one of said data segments and the associated one of said header segments; and means for passing the internal buffer list from one layer in said communications stack to a higher layer in said communications stack, wherein the one of said data segments is passed to the higher layer in said communications stack discontiguously from its associated header segment and without physically moving the one of said data segments associated with the one of said header segments, and without creating a copy of the one of said data segments associated with the one of said header segments.

20. A system for assembling according to claim 19 wherein the generating internal buffer list means comprises:

means for generating a token representing the one of said data segments, said token being uniquely associated with the corresponding one of said data segments;

means for generating a buffer list header pointer uniquely referencing the one of said data segments corresponding to the one of said header segments;

means for storing the token in the internal buffer list; and means for storing the buffer list header pointer in the internal buffer list.

21. A system for assembling according to claim 18 wherein the generating means comprises:

means for identifying one of said header segments in said discontiguous datastream;

means for storing a header pointer for referencing the identified one of said header segments in the datastream buffer list;

means for identifying one of said data segments in said discontiguous datastream which uniquely corresponds to the identified one of said header segments; and means for storing a data pointer for referencing the identified one of said data segments in the datastream buffer list.

22. A system for assembling according to claim 18 wherein said communications stack is a communications stack implemented in a virtual telecommunications access method (VTAM) system.

23. A computer program product for assembling a plurality of data segments and a plurality of header segments into a datastream for transmission across a network channel, each one of said data segments uniquely corresponding to one of said header segments, and said network channel generally requiring each one of said data segments to be contiguous with the uniquely corresponding one of said header segments to enable efficient transmission of data segments and corresponding header segments across the network channel, said computer program product comprising:

a computer readable storage medium having computer readable code means embodied in said medium, said computer readable code means comprising:

computer instruction means for copying the plurality of header segments into a datastream header area of a datastream buffer, said header segments being sequentially stored in said datastream header area of the datastream buffer;

computer instruction means for associating each one of said header segments stored in said datastream header area of the datastream buffer with the one of said data segments corresponding thereto; and computer instruction means for generating a datastream buffer list comprising entries referencing said header segments in said datastream header area of the datastream buffer and entries referencing said data segments;

wherein said data segments, said datastream buffer list and said datastream buffer having a datastream header area may be used collectively to form a datastream for transmission across the network channel without physically moving the data segments and without creating a copy of the data segments until transmission of the datastream, said datastream having a datastream header area and a datastream data area such that said header segments in said datastream header area may be discontiguously located in said datastream from the data segments in said datastream data area corresponding thereto and said datastream is formed at the time of transmission of said datastream on said network channel.

24. A computer program product for assembling according to claim 23 wherein said assembling occurs in a communications stack having multiple layers, and wherein said computer readable code means further comprises computer instruction means for receiving said data segments and said header segments from one layer of said multiple layers in the communications stack.

25. A computer program product for assembling according to claim 24 wherein said communications stack is a communications stack implemented in a virtual telecommunications access method (VTAM) system.

26. A computer program product for assembling according to claim 23, wherein said computer readable code means further comprises:

computer instruction means for transmitting the datastream header area having the plurality of header segments across the network channel;

computer instruction means for obtaining the plurality of data segments referenced by the datastream buffer list; and computer instruction means for transmitting the obtained plurality of data segments referenced by the datastream buffer list across the network channel as a datastream data area;

wherein the combination of said header segments in said datastream header area and said data segments in said datastream data area form the datastream and said header segments in said datastream header area are discontiguously located in said datastream from the data segments in said datastream data area corresponding thereto.

27. A computer program product for assembling according to claim 23 wherein said datastream header area of said datastream buffer has a block header portion, and said computer readable code means further comprises computer instruction means for storing datastream specific information in said block header portion.

28. A computer program product for assembling according to claim 23 wherein said computer instruction means for associating comprises:

computer instruction means for determining the displacement between each header segment in the datastream header area of the datastream and the data segment in the datastream data area corresponding to such header segment; and computer instruction means for storing the determined displacement in said datastream header area in association with the header segment corresponding to the data segment.

29. A computer program product for assembling in a communications stack having multiple layers header segments and corresponding data segments from a discontiguous datastream received on a network channel, said received discontiguous datastream comprising a datastream header area having a plurality of header segments and a datastream data area having a plurality of data segments, each one of said data segments uniquely corresponding to one of said header segments, said one of said data segments located in said datastream in a discontiguous relationship to said corresponding one of said header segments, said computer program product comprising:

a computer readable storage medium having computer readable code means embodied in said medium, said computer readable code means comprising:

computer instruction means for generating a datastream buffer list having a header entry referencing one of said header segments in said discontiguous datastream and a data entry referencing one of said data segments in said discontiguous datastream which uniquely corresponds to the one of said header segments;

computer instruction means for storing said one of said header segments in a header segment buffer;

computer instruction means for storing said one of said data segments in a data segment buffer; and computer instruction means for discontiguously passing said one of said data segments and said uniquely corresponding one of said header segments to a second layer in said communications stack, wherein said one of said data segments is passed to the second layer in said communications stack discontiguously from its associated one of said header segments and without physically moving the one of said data segments associated with the one of said header segments and without creating a copy of the one of said data segments associated with the one of said header segments.

30. A computer program product for assembling according to claim 29 wherein the computer instruction means for generating comprises:

computer instruction means for identifying one of said header segments in said discontiguous datastream;

computer instruction means for storing a header pointer for referencing the identified one of said header segments in the datastream buffer list;

computer instruction means for identifying one of said data segments in said discontiguous datastream which uniquely corresponds to the identified one of said header segments; and computer instruction means for storing a data pointer for referencing the identified one of said data segments in the datastream buffer list.

31. A computer program product for assembling according to claim 30 wherein the computer instruction means for discontiguously passing comprises:

computer instruction means for generating a communications stack internal buffer list for the one of said data segments, the internal buffer list being uniquely associated with the one of said data segments and the associated one of said header segments; and computer instruction means for passing the internal buffer list from one layer in said communications stack to a higher layer in said communications stack, wherein the one of said data segments is passed to the higher layer in said communications stack discontiguously from its associated header segment and without physically moving the one of said data segments associated with the one of said header segments, and without creating a copy of the one of said data segments associated with the one of said header segments.

32. A computer program product for assembling according to claim 31 wherein the computer instruction means for generating a communications stack internal buffer list comprises:

computer instruction means for generating a token for representing the one of said data segments, said token being uniquely associated with the corresponding one of said data segments;

computer instruction means for generating a buffer list Header pointer for uniquely referencing the one of said data segments corresponding to the one of said header segments;

computer instruction means for storing the token in the internal buffer list; and computer instruction means for storing the buffer list header pointer in the internal buffer list.

33. A computer program product for assembling according to claim 29 wherein said communications stack is a communications stack implemented in a virtual telecommunications access method (VTAM) system.

* * * * *